(12) United States Patent
Schwartz et al.

(10) Patent No.: US 10,577,253 B2
(45) Date of Patent: Mar. 3, 2020

(54) FERRITE THICK FILMS AND CHEMICAL SOLUTION-BASED METHODS OF PREPARATION THEREOF

(71) Applicant: North Carolina State University, Raleigh, NC (US)

(72) Inventors: Justin Schwartz, Raleigh, NC (US); Taryn Kittel, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 128 days.

(21) Appl. No.: 15/410,067

(22) Filed: Jan. 19, 2017

(65) Prior Publication Data

US 2017/0203972 A1    Jul. 20, 2017

Related U.S. Application Data

(60) Provisional application No. 62/280,317, filed on Jan. 19, 2016.

(51) Int. Cl.
| | | |
|---|---|---|
| *C01G 49/00* | (2006.01) | |
| *B28B 1/14* | (2006.01) | |
| *C01G 51/00* | (2006.01) | |
| *C01G 53/00* | (2006.01) | |
| *C01G 9/00* | (2006.01) | |

(Continued)

(52) U.S. Cl.
CPC ........ *C01G 49/0063* (2013.01); *B29C 39/003* (2013.01); *B29C 39/02* (2013.01); *C01G 51/006* (2013.01); *C01G 53/006* (2013.01); *H01Q 17/004* (2013.01); *B29C 41/12* (2013.01); *B29D 7/01* (2013.01); *B29K 2105/0073* (2013.01); *B29L 2007/00* (2013.01); *B29L 2031/3456* (2013.01); *C08J 5/18* (2013.01)

(58) Field of Classification Search
CPC ........ C01G 49/0063; C04B 2235/6025; C04B 2235/666
USPC ........................................................ 264/611
See application file for complete search history.

(56) References Cited

U.S. PATENT DOCUMENTS

| | | | | |
|---|---|---|---|---|
| 4,710,227 A | * | 12/1987 | Harley ................... | B82Y 30/00 149/47 |
| 6,737,012 B2 | * | 5/2004 | Nakano ................ | C01G 49/009 252/62.51 R |

(Continued)

OTHER PUBLICATIONS

Sathishkumar, G. et al. "Synthesis, Structural and Dielectric Studies of Nickel Substituted Cobalt-Zinc Ferrite". Materials Sciences and Applications, 2010, vol. 1, No. 1, pp. 19-24. (Year: 2010).*

(Continued)

*Primary Examiner* — Erin Snelting
(74) *Attorney, Agent, or Firm* — Thomas|Horstemeyer, LLP

(57) ABSTRACT

Ferrite films, antennas including ferrite films, and methods of making thereof are provided. The methods can include tape casting of a slurry to produce a green film, wherein the slurry includes a ferrite powder, a dispersant, and a binder in a suitable solvent; and densifying the green film to produce the ferrite film having a thickness of 50 μm to 5 mm. The methods can be used to make large area films, for example the films can have a lateral area of about 1000 cm² to 3000 cm². VHF/UHF antennas are including the ferrite films are also provided.

18 Claims, 16 Drawing Sheets

(51) Int. Cl.
| | |
|---|---|
| B29C 39/02 | (2006.01) |
| B29C 39/00 | (2006.01) |
| H01Q 17/00 | (2006.01) |
| B29L 7/00 | (2006.01) |
| B29L 31/34 | (2006.01) |
| C08J 5/18 | (2006.01) |
| B29C 41/12 | (2006.01) |
| B29K 105/00 | (2006.01) |
| B29D 7/01 | (2006.01) |

(56) References Cited

U.S. PATENT DOCUMENTS

| | | | |
|---|---|---|---|
| 2012/0088070 A1* | 4/2012 | Nishi | C04B 35/26 428/141 |
| 2013/0057375 A1* | 3/2013 | Ankyu | B32B 18/00 336/83 |
| 2015/0221424 A1* | 8/2015 | Kobayashi | C04B 35/2633 252/62.57 |
| 2016/0176722 A1* | 6/2016 | Yu | C01G 49/08 252/62.56 |

OTHER PUBLICATIONS

Sun, Jingjing, et al. "Synthesis of dense NiZn ferrites by spark plasma sintering." Ceramics International, vol. 23, Issue 8, 2002, pp. 855-858. (Year: 2002).*

Gao, Lian et al. "Superfast Densification of Oxide/Oxide Ceramic Composites." Journal of the American Ceramic Society, vol. 82, Issue 4, 1999, pp. 1061-1063. (Year: 1999).*

N. Matsushita, T. Nakamura, and M. Abe, Ni—Zn—Co ferrite films prepared at 90 C having 30 at 3 GHz, Magnetics, IEEE Transactions on, vol. 38, pp. 3111-3113, 2002.

J. M. Bell, M. E Iskander, and J. Lee, Ultrawideband hybrid EBG/ferrite ground plane for lowprofilearray antennas, Antennas and Propagation, IEEE (2007), pp. 1313-1316.

D. J. Kern, D. H. Werner, and M. Lisovich, Metaferrites: using electromagnetic bandgapstructures to synthesize metamaterial ferrites, Antennas and Propagation, IEEE Transactions on,vol. 53, pp. 1382-1389, 2005.

Y. He, H. Peng, V. G. Harris, and C. Vittoria, Role of Ferrites in Negative Index Metamaterials, Magnetics, IEEE Transactions on, vol. 42, pp. 2852-2854, 2006.

F. Erkmen, C.-C. Chen, and J. L Volakis, "Impedance matched ferrite layers as ground plane treatments to improve antenna wideband performance," Antennas and Propagation, IEEE Transactions on, vol. 57, pp. 263-266, 2009.

O. Acher, M. Ledieu, M. Abe, M. Tada, N. Matsushita, M. Yoshimura, et al., "GHz permeability of sprayed NiZn ferrite films," Journal of Magnetism and Magnetic Materials, vol. 310, pp. 2532-2533, Mar. 2007.

A. Fujiwara, M. Tada, T. Nakagawa, and M. Abe, ""Permeability and electric resistivity of spinsprayedZn ferrite films for high-frequency device applications,"" Journal of Magnetism andMagnetic Materials, vol. 320, pp. L67-L69, 2008.

T. H. Hai, H. T. B. Van, T. C. Phong, and M. Abe, Spinel ferrite thin-film synthesis by spinsprayferrite plating, Physica B: Condensed Matter, vol. 327, pp. 194-197, 4// 2003.

K. Kondo, T. Chiba, S. Yoshida, S. Okamoto, Y. Shimada, N. Matsushita, et al., FMR study onspin-sprayed Ni—Zn—Co ferrite films with. high permeability usable for GHz noise suppressors, Ieee Transactions on Magnetics, vol. 41, pp. 3463-3465, Oct. 2005.

N. Matsushita, T. Nakamura, and M. Abe, Spin-sprayed Ni—Zn—Co ferrite films with high mu(r)>100 in extremely wide frequency range 100 MHz-1 GHz, Journal of Applied Physics, vol. 93, pp. 7133-7135, May 15, 2003.

A. K. Subramani, K Kondo, M. Tada, M. Abe, M. Yoshimura, and N. Matsushita, Highresistive ferrite films by a solution process for electromagnetic compatible (EMC) devices, Journal of Magnetism and Magnetic Materials, vol. 321, pp. 3979-3983, Dec. 2009.

A. K. Subramani, K Kondo, M. Tada, M. Abe, M. Yoshimura, and N. Matsushita, Spinel ferritefilms by a novel solution process for high frequency applications, Materials Chemistry andPhysics, vol. 123, pp. 16-19, Sep. 2010.

S. Seifikar, T. Rawdanowicz, W. Straka, C. Quintero, N. Bassiri-Gharb, and J. Schwartz, Structural and magnetic properties of sol-gel derived NiFe 2 O 4 thin films on siliconsubstrates, Journal of Magnetism and Magnetic Materials, vol. 361, pp. 255-261, 2014.

S. Seifikar, A. Tabei, E. Sachet, T. Rawdanowicz, N. Bassiri-Gharb, and J. Schwartz, Growth of(111) oriented NiFe2O4 polycrystalline thin films on Pt (111) via sol-gel processing, Journal ofApplied Physics, vol. 112, p. 063908, 2012.

S. Seifikar, B. Calandro, G. Rasic, E. Deeb, J. Yang, N. Bassiri? Gharb, et al.,OptimizedGrowth of Heteroepitaxial (111) NiFe2O4 Thin Films on (0001) Sapphire with Two In?PlaneVariants via Chemical Solution Deposition, Journal of the American Ceramic Society, vol. 96,pp. 3050-3053, 2013.

G. Rasic and J. Schwartz, Nanoimprint lithographic surface patterning of sol-gel fabricatednickel ferrite (NiFe 2 O 4), MRS Communications, vol. 3, pp. 207-211, 2013.

N. Bertolino, J. Garay, U. Anselmi-Tamburini, and Z. A. Munir, High-flux current effects ininterfacial reactions in Au—Al multilayers, Philosophical Magazine B-Physics of CondensedMatter Statistical Mechanics Electronic Optical and Magnetic Properties, vol. 82, pp. 969-985,May 2002.

M. Cologna, J. S. C. Francis, and R. Raj, Field assisted and flash sintering of alumina and its relationship to conductivity and MgO-doping, Journal of the European Ceramic Society, vol. 31,pp. 2827-2837, Dec. 2011.

M. Cologna, B. Rashkova, and R. Raj, Flash Sintering of Nanograin Zirconia in < 5 s at 850degrees C, Journal of the American Ceramic Society, vol. 93, pp. 3556-3559, Nov. 2010.

J. A. Downs and V. M. Sglavo, Electric Field Assisted Sintering of Cubic Zirconia at 390degrees C, Journal of the American Ceramic Society, vol. 96, pp. 1342-1344, May 2013.

A. Michalski and D. Siemiaszko, Nanocrystalline cemented carbides sintered by the pulseplasma method, International Journal of Refractory Metals & Hard Materials, vol. 25, pp. 153-158, 2007.

A. L. G.Prette, M. Cologna, V. Sglavo, and R. Raj, Flash-sintering of Co2MnO4 spinel for solidoxide fuel cell applications, Journal of Power Sources, vol. 196, pp. 2061-2065, Feb. 2011.

J. R. Friedman, J. E. Garay, U. Anselmi-Tamburini, and Z. A. Munir, Modified interfacialreactions in Ag—Zn multilayers under the influence of high DC currents, Intermetallics, vol. 12,pp. 589-597, Jun. 2004.

J. E. Garay, U. Anselmi-Tamburini, and Z. A. Munir, Enhanced growth of intermetallic phasesin the Ni-Ti system by aurrent effects, Acta Materialia, vol. 51, pp. 4487-4495, Sep 2003.

S. H. Risbud, J. R. Groza, and M. J. Kim, Clean Grain-Boundaries in Aluminumnitride Ceramics Densified Without Additives by a Plasma-Activatedsintering Process, Philosophical Magazine B-Physics of Condensed Matter StatisticalMechanics Electronic Optical and Magnetic Properties, vol. 69, pp. 525-533, Mar. 1994.

M. Yue, J. X. Zhang, Y. F. Xiao, G. P. Wang, and T. Li, New kind of NdFeB magnet preparedby spark plasma sintering, IEEE Transactions on Magnetics, vol. 39, pp. 3551-3553, Nov. 2003.

T. B. Holland, J. F. Loffler, and Z. A. Munir, Crystallization of metallic glasses under theinfluence of high density dc currents, Journal of Applied Physics, vol. 95, pp. 2896-2899, Mar. 2004.

R. Raj, M. Cologna, and J. S. C. Francis, Influence of Externally Imposed and InternallyGenerated Electrical Fields on Grain Growth, Diffusional Creep, Sintering and RelatedPhenomena in Ceramics, Journal of the American Ceramic Society, vol. 94, pp. 1941-1965, Jul. 2011.

R Orru, R. Licheri, A. M Locci, A. Cincotti, and G. C. Cao, Consolidation/synthesis ofmaterials by electric current activated/assisted sintering, Materials Science & Engineering RReports,vol. 63, pp. 127-287, Feb. 2009.

J. Anselmi-Tamburini, J. E. Garay, and Z. A. Munir, Fundamental investigations on the sparkplasma sintering/synthesis process III.

(56) References Cited

OTHER PUBLICATIONS

Current effect on reactivity, Materials Science andEngineering a-Structural Materials Properties Microstructure and Processing, vol. 407, pp. 24-30, Oct. 2005.
J. Anselmi-Tamburini, S. Gennari, J. E. Garay, and Z. A. Munir, Fundamental investigations onthe spark plasma sintering/synthesis process—II. Modeling of current and temperature distributions, Materials Science and Engineering a-Structural Materials PropertiesMicrostructure and Processing, vol. 394, pp. 139-148, Mar. 2005.
W. Chen, U. Anselmi-Tamburini, J. E. Garay, J. R. Groza, and Z. A. Munir, Fundamentalinvestigations on the spark plasma sintering/synthesis process—I. Effect of dc pulsing onreactivity, Materials Science and Engineering a-Structural Materials Properties Microstructureand Processing, vol. 394, pp. 132-138, Mar. 2005.
J. R. Groza and A. Zavaliangos, Sintering activation by external electrical field, MaterialsScience and Engineering a-Structural Materials Properties Microstructure and Processing, vol. 287, pp. 171-177, Aug. 2000.
KashchieV, D., Nucleation in External Electric-Field, Journal of Crystal Growth,vol. 13, pp. 128-&, 1971.
A. M. Locci, R. Lichen, R. Orru, and G. Cao, Reactive Spark Plasma Sintering of rheniumdiboride, Ceramics International, vol. 35, pp. 397-400, Jan. 2009.
C. A. Machida and Z. A. Munir, The development of thermal etch pits on cleaved NaCl-crystalsin the presence of an electric-field, Journal of Crystal Growth, vol. 68, pp. 665-670, 1984.
Z. A. Munir, D. V. Quach, and M. Ohyanagi, Electric Current Activation of Sintering: A Reviewof the Pulsed Electric Current Sintering Process, Journal of the American Ceramic Society, vol. 94, pp. 1-19, Jan. 2011.
A. Saiki, T. Hashizume, and K. Terayama, Effect of Pulsed Electrical Field on Deposition ofYSZ Thin Films in an Aqueous Solution, Materials Transactions, vol. 51, pp. 297-300, Feb. 2010.
S. X. Song, Z. Wang, and G. P. Shi, Heating mechanism of spark plasma sintering, CeramicsInternational, vol. 39, pp. 1393-1396, Mar. 2013.
R. Raj, Joule heating during flash-sintering, Journal of the European Ceramic Society, vol. 32,pp. 2293-2301, Aug. 2012.
J. S. C. Francis, M. Cologna, and R. Raj, Particle size effects in flash sintering, Journal of theEuropean Ceramic Society, vol. 32, pp. 3129-3136, Sep. 2012.
X. Chen, K. A. Khor, S. H. Chan, and L. G. Yu, Overcoming the effect of contaminant in solidoxide fuel cell (SOFC) electrolyte: spark plasma sintering (SPS) of 0.5 wt.% silica-doped yttriastabilizedzirconia (YSZ), Materials Science and Engineering a-Structural Materials PropertiesMicrostructure and Processing, vol. 374, pp. 64-71, Jun. 2004.
A. Bassano, M. T. Buscaglia, V. Buscaglia, and P. Nanni, Particle Size and Morphology Controlof Perovskite Oxide Nanopowders for Nanostructured Materials, Integrated Ferroelectrics, vol. 109, pp. 1-17, 2009.
C. Drouet, C. Largeot, G. Raimbeaux, C. Estoumes, G. Dechambre, C. Combes, et al., Bioceramics: spark plasma sintering (SPS) of calcium phosphate, Advances in Science andTechnology, vol. 49, pp. 45-50, Oct. 2006.
A. Rosenberger, Y. Gao, and L Stanciu, Field-assisted sintering of Li1.3Al0.3Ti1.7(PO4)(3)solid-state electrolyte, Solid State Ionics, vol. 278, pp. 217-221, Oct. 2015.

P. Asokakumar, K. Obrien, K. G. Lynn, P. J. Simpson, and K. P. Rodbell, Detection of currentinducedvacancies in thin aluminum-copper lines using positrons, Applied Physics Letters, vol. 68, pp. 406-408, Jan. 1996.
J. E. Garay, S. C. Glade, U. Anselmi-Tamburini, P. Asoka-Kumar, and Z. A. Munir, Electriccurrent enhanced defect mobility in Ni3Ti intermetallics, Applied Physics Letters, vol. 85, pp. 573-575, Jul. 2004.
H. T. Orchard and A. L. Greer, Electromigration effects on compound growth at interfaces, Applied Physics Letters, vol. 36, Jun. 2005.
G. Q. Xie, O. Ohashi, K. Chiba, N. Yamaguchi, M. H. Song, K. Furuya, et al., Frequency effecton pulse electric current sintering process of pure aluminum powder, Materials Science and Engineering a-Structural Materials Properties Microstructure and Processing, vol. 359, pp. 384-390, Oct. 2003.
W. Straka and J. Schwartz, Densification of thoria thorugh flash sintering, MRSCommunications, 2017, 7, 677-682.
S. Seifikar, B. Calandro, E. Deeb, E. Sachet, J. Yang, J.-P. Maria, et al., Structural and magneticproperties of biaxially textured NiFe2O4 thin film on (0001) c-plane sapphire, Journal of AppliedPhysics, vol. 112, p. 123910 (5 pp), 2012.
Z. Yue, J. Zhou, L. Li, H. Zhang, and Z. Gui, Synthesis of nanocrystalline NiCuZn ferritepowders by sol-gel auto-combustion method, Journal of Magnetism and Magnetic Materials,vol. 208, pp. 55-60, 2000.
S. S. Ebrahimi and J. Azadmanjiri, Evaluation of NiFe 2 O 4 ferrite nanocrystalline powdersynthesized by a sol-gel auto-combustion method, Journal of Non-Crystalline Solids, vol. 353,pp. 802-804, 2007.
J. Azadmanjiri, S. S. Ebrahimi, and H. Salehani, Magnetic properties of nanosize NiFe 2 O 4particles synthesized by sol-gel auto combustion method, Ceramics International, vol. 33, pp. 1623-1625, 2007.
Azadmanjiri, et al., "Preparation and electromagnetic properties of Ni 1-x CU x Fe 2 O 4 nanoparticle ferrites by sol-gel auto-combustion method," Materials letters 61, pp. 84-87, 2007.
X. H. Sang, E. D. Grimley, T. Schenk, U. Schroeder, and J. M. LeBeau, On the structural originsof ferroelectricity in HfO2 thin films, Applied Physics Letters, vol. 106, p. 4, Apr. 2015.
X. H. Sang and J. M. LeBeau, Revolving scanning transmission electron microscopy: Correctingsample drift distortion without prior knowledge, Ultramicroscopy, vol. 138, pp. 28-35, Mar. 2014.
Y. Bastani, T. Schmitz-Kempen, A. Roelofs, and N. Bassiri-Gharb, Critical thickness forextrinsic contributions to the dielectric and piezoelectric response in lead zirconate titanateultrathin films, Journal of Applied Physics, vol. 109, Jan. 2011.
Y. Bastani and N. Bassiri-Gharb, Processing Optimization of Lead Magnesium Niobate-LeadTitanate Thin Films for Piezoelectric MEMS Application, Journal of the American CeramicSociety, vol. 95, pp. 1269-1275, Apr. 2012.
Y. Bastani and N. Bassiri-Gharb, Enhanced dielectric and piezoelectric response in PZTsuperlattice-like films by leveraging spontaneous Zr/Ti gradient formation, Acta Materialia, vol. 60, pp. 1346-1352, Feb. 2012.
S. Kim, Y. Bastani, H. D. Lu, W. P. King, S. Marder, K. H. Sandhage, et al., Direct Fabricationof Arbitrary-Shaped Ferroelectric Nanostructures on Plastic, Glass, and Silicon Substrates, Advanced Materials, vol. 23, pp. 3786-+, Sep. 2011.

\* cited by examiner

FERRITE THICK FILMS AND CHEMICAL SOLUTION-BASED METHODS OF PREPARATION THEREOF

CROSS-REFERENCE TO RELATED APPLICATIONS

This application claims priority to, and the benefit of, U.S. provisional application entitled "FERRITE THICK FILMS AND CHEMICAL SOLUTION-BASED METHODS OF PREPARATION THEREOF" having Ser. No. 62/280,317 filed Jan. 19, 2016, the contents of which are incorporated by reference in their entirety.

TECHNICAL FIELD

The present disclosure generally relates to ferrimagnetic films and methods of preparation thereof.

BACKGROUND

State of the art, wide-bandwidth antennas have resisted dramatic size reductions due to the inability to develop nanostructured materials at a technologically relevant scale. Dual polarized thin printed phased arrays having bandwidths greater than 10:1, where the bandwidth is defined as the ratio of the upper to lower operating frequencies, provide future differentiators enabling superior performance for many applications. An important component in achieving high performance over a wide bandwidth is the development of high impedance nanostructured substrates. These substrates, utilized in printed phased array designs, will support dual polarization, a low profile conformal footprint and a high frequency response from 0.1-5 GHz.

Developing ultra-wide bandwidth conformal apertures requires properties from the inter-cavity substrate unavailable in traditional bulk magnetic materials. These properties include a high resistivity (>10 Ohm-m), a high relative permeability to permittivity ratio (>3), and a greater than unity and a greater than unity relative $\mu'$ and $\mu''$ across the frequency range of interest. The physical properties of the substrate material are governed in a large part by the microstructure of the film. The product of permeability and cut-off frequency is invariant for a material and is the Snoek limit. However, an enhancement of properties occurs when the grain size of the ferrite film is less than about 30 nm. By reducing the dimensionality of the film, permeability is extended to frequencies higher than observed in the bulk solid. As a result, the Snoek limit can be exceeded in these reduced dimensionality materials.

Inverse spinels are amongst the most widely studied materials for magnetic applications due to their favorable magnetic properties. In this structure, magnetization arises only from the magnetic moments of the trivalent M ions due to the antiferromagnetic coupling of the divalent iron ions. The most commonly studied of these materials include ferrous ferrite, nickel ferrite, manganese ferrite, and cobalt ferrite. With the exception of cobalt ferrite, these materials all exhibit soft magnetic behavior, which means that they magnetize and demagnetize easily. Further, these materials display high permeability, saturation magnetization, and electrical resistivity, which make them ideal for high-frequency applications.

The primary challenge preventing the implementation of inverse spinel ferrites into antennae applications is the inability to obtain the necessary electromagnetic properties in films that are sufficiently large in-plane and sufficiently thick. For example, Ni—Zn—Co ferrite thin films have been synthesized by a spin-spray technique with high $\mu''$ at high frequency. These films showed columnar grain structures with grains that were through-thickness (~1 µm) in height and sub-µm in-plane grain sizes. However, the spin spray technique is not scalable to the very large area substrates and thick films required. This is due to the non-uniformity inherent in the nozzle spray process as well as the inefficient use of precursor chemicals.

There remains a need for improved methods of making ferrite thick films.

SUMMARY

Various methods of making a ferrite film are provided. The methods can produce ferrite thick films, e.g. having a thickness of greater than 50 µm, greater than 100 µm, greater than 150 µm, or greater than 250 µm. The methods can include tape casting of a slurry to produce a green film, wherein the slurry includes a ferrite powder, a dispersant, a plasticizer, and a binder in a suitable solvent. The tape casting can include casting the green film onto a glass or polymer substrate and/or heating the green film to burnout additional components. The methods can also include one or more approaches to densifying the green film to produce the ferrite. Methods of densifying the green film can include applying pressure, applying an electrical current, and/or sintering the green film. Densifying can include heating the green film to a temperature of about 900° C. to 1400° C. and maintaining the temperature for a period of time of about 1 hour to 150 hours. A variety of dispersants, binders, and solvents can be used. In some embodiments the dispersant is fish oil. A typical binder can include polyvinyl butyral. The solvent can include ethanol or other alcohols.

A variety of ferrite thick films can be produced, including inverse spinel ferrites. The ferrite can be $XFe_2O_4$, where X is Ni, Zn, Co, Fe, Ti, Mn, or a combination thereof. The ferrite can be $Ni_xCo_yFe_zO_4$, $Ni_xZn_yFe_zO_4$, or $Co_xZn_yFe_zO_4$. Typical values for x can be about 0.1 to 0.6, for y can be about 0.1 to 0.6, and for z can be about 1.8 to 2.8. The ferrite can be $Ni_{0.19}Zn_{0.28}Co_{0.03}Fe_{2.5}O_4$. The ferrite film can have a thickness of about 150 µm to 2.5 mm. The ferrite film can have a lateral area of about 1000 cm$^2$ to 3000 cm$^2$. Electronic devices, including VHF/UHF antenna, are also provided containing the ferrite thick films.

Other systems, methods, features, and advantages of the ferrite thick films will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

DETAILED DESCRIPTION

Figure 1:
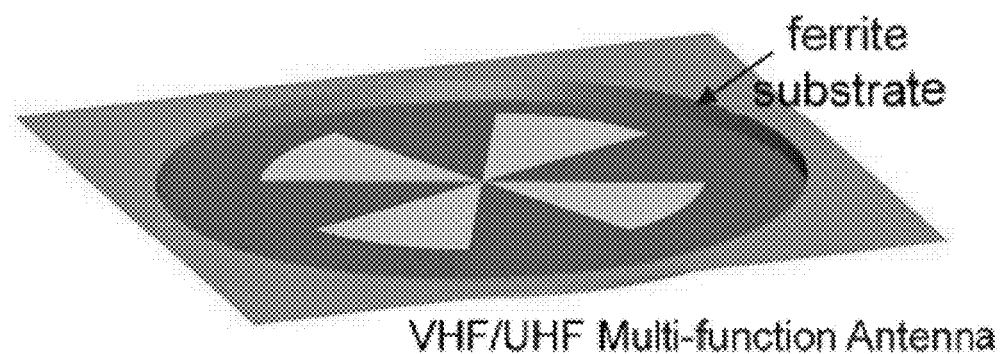
FIG. 1 depicts one embodiment of a very high frequency (VHF)/ultra high frequency (UHF) antenna.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The terms "green film" and "green tape," as interchangeably used herein, refer to a tape in its unfired state which upon being heated to ceramic-forming temperatures, generally in the range of from about 900° to 2000° C., is converted to a unitary ceramic body of polycrystalline or mixed polycrystalline and glassy structure by the volatilization of the support matrix and sintering or fusing together of the ceramic raw material particles.

The term "xerogel," as used herein, refers the solid or semisolid network formed from a sol-gel process which remains after solvents and other swelling agents have been removed, typically by heating.

Methods of Making Ferrite Thick Films

Figure 9:
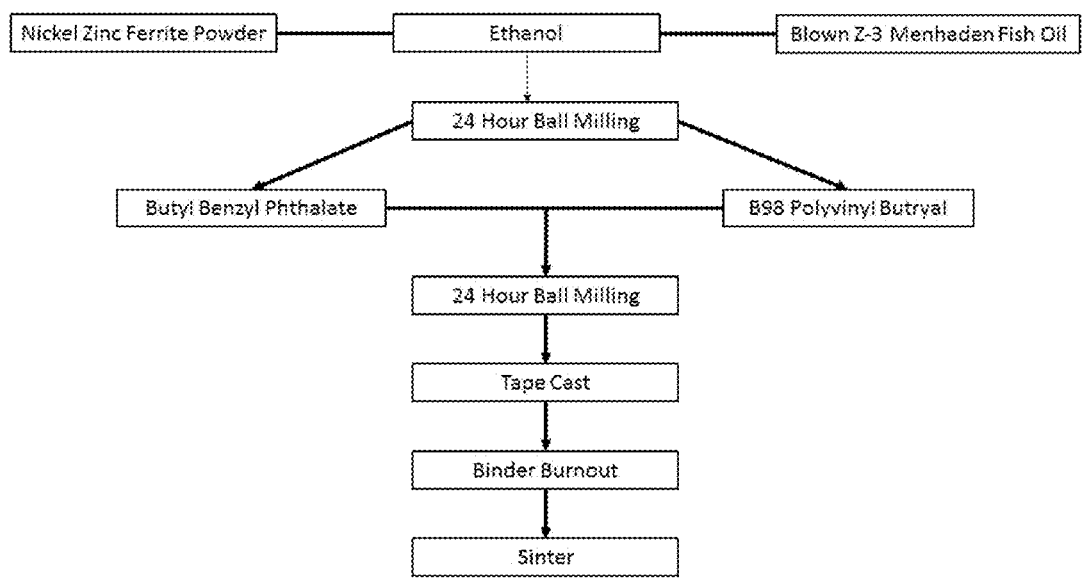
FIG. 9 is a flow chart depicting one embodiment of a method of making ferrite thick films.

Methods of making ferrite films are provided. One exemplary embodiment of the method is depicted in FIG. 9. The methods can include producing a slurry containing a ferrite powder.

The slurry can be tape cast to form a green film having a variety of thicknesses and lateral surface areas. Densifying the green film can produce the ferrite films, e.g. thick films having a thickness of greater than 50 μm, 100 μm, or 150 μm.

The ferrite powder can be purchased or can be prepared by sol-gel auto combustion. The methods can include forming a stoichiometric mixture of metal salts and complexing agents, where the metal in the metal salt can be Ni, Zn, Co, Fe, Ti, Mn, or any combination thereof. Suitable complexing agents can include citric acid, urea, glycine, or combinations thereof. The methods can include heating the mixture to form a xerogel. The methods can include igniting the xerogel to produce the ferrite powder.

A variety of ferrite powders can be used in the slurry. The ferrite powder can include $XFe_2O_4$, wherein X is Ni, Zn, Co, Fe, Ti, Mn, or any combination thereof. The ferrite powder can be an inverse spinel ferrite. The ferrite powder can include $Ni_xCo_yFe_zO_4$, $Ni_xZn_yFe_zO_4$, or $Co_xZn_yFe_zO_4$. Each occurrence of x can be about 0.05 to 0.75, about 0.1 to 0.6, about 0.2 to 0.6, or about 0.25 to 0.55. Each occurrence of y can be about 0.05 to 0.75, about 0.1 to 0.6, about 0.2 to 0.6, or about 0.25 to 0.55. Each occurrence of z can be about 1.5 to 3.0, about 1.8 to 2.8, about 1.8 to 2.3, or about 2.0. The sum of x, y, and z can be about 3.0. In some embodiments, the ferrite powder has the formula $Ni_{0.19}Zn_{0.28}Co_{0.03}Fe_{2.5}O_4$. The ferrite powder can include Co having a stoichiometry ranging from about 0.01 to 0.6, about 0.05 to 0.5, about 0.01 to 0.1, or about 0.3 to 0.6. The ferrite powder can have an average particle diameter of about 10 nm to 200 nm, about 10 nm to 100 nm, about 20 nm to 100 nm, about 20 nm to 50 nm, or about 10 nm to 30 nm.

The methods can include preparing a slurry containing the ferrite powder in a suitable solvent. The slurry can include about 40 wt % to 80 wt % ferrite powder, about 50 wt % to 80 wt % ferrite powder, about 50 wt % to 70 wt % ferrite powder, or about 55 wt % to 65 wt % ferrite powder based upon the weight of the slurry. The solvent can include ethanol, toluene, acetlyacetone, xylene, or a combination thereof. The solvent can be present in the slurry in an amount from about 20 wt % to 60 wt %, about 20 wt % to 50 wt %, or about 20 wt % to 40 wt % based upon the weight of the slurry. The slurry can include additional components such as dispersants, binders, and plasticizers. The methods can include ball milling a mixture of the ferrite powder to increase the homogeneity. The ball milling can include first ball milling a mixture of the ferrite powder, solvent, and dispersant to homogeneously disperse the ferrite powder. This can be done, for example, for a period of about 12 hours to 48 hours, or about 24 hours. The methods can include adding plasticizer and/or binder, additionally including further ball milling to mix the components of the slurry.

Suitable dispersants can include, for instance, long chain carboxylic acids including stearic acid, oleic acid, lauric acid; long chain amines; quaternary ammonium salts; acrylic acids including polyacrylic acids; acrylate salts; methacrylic acids including polymethacrylic acids; methacrylate salts including salts of polymethacrylic acid; polycaprolactams; and phosphate esters. In some embodiments the dispersant is fish oil, in particular blown menhaden fish oil. The dispersants can be present in an amount from about 0.1 wt % to 10 wt %, about 0.1 wt % to 5 wt %, about 0.5 wt % to 5 wt %, or about 0.5 wt % to 2.5 wt % based upon the weight of the slurry.

Suitable binders can include polyvinyl alcohol, acrylic polymers, polyglycols, polyvinyl acetate, polyisobutylene, polycarbonates, polystyrene, polyacrylates, derivatives thereof, copoylmers thereof, and mixtures thereof. In some embodiments the binder is a polyvinyl butyral such as butvar (B98). The binder can be present in an amount from about 2 wt % to 20 wt %, about 2 wt % to 10 wt %, about 2 wt % to 5 wt %, or about 3 wt % to 5 wt % based upon the weight of the slurry.

Suitable plasticizers can include phthalic acid esters such as dimethyl phthalate, dibutyl phthalate, diethyl phthalate, and butyl benzyl phthalate; sebacic acid esters such as dibutyl sebacate; citric acid esters such as triethyl citrate, tributyl citrate tributyl citrate; benzoic acid esters such as benzyl benzoate; polyethylene glycols; propylene glycol butyl, and/or glycol esters of fatty acids; refined mineral oils; oleic acid; castor oil; corn oil; camphor; and sugar alcohols such as sorbitol. The plasticizer can be present in an amount from about 0.1 wt % to 10 wt %, about 0.1 wt % to 5 wt %, about 0.5 wt % to 5 wt %, or about 0.5 wt % to 2.5 wt % based upon the weight of the slurry.

The methods can include tape casting of the slurry to produce a green film. The term "tape casting," as generally used herein, refers to a process of producing a ceramic tape from a ceramic slurry. The tape casting can include placing the slurry into a chamber or container having a gap. The width of the gap can be adjusted, for example via a 'doctor blade" that can control the thickness of the green film produced. The length of the gap can range from about 5 cm or 10 cm to about 50 cm, 100 cm, or greater. The tape casting can include moving a substrate, such as a glass or a polymer substrate, relative to the gap so that the green film is produced on the substrate and/or moving the gap or doctor blade relative to the substrate so that the green film is produced on the substrate. The green film can be produced having a thickness of greater than 50 μm, 100 μm, or 150 μm. For example the green film can have a thickness of about 50 μm to 5 mm, about 100 μm to 5 mm, about 150 μm to 5 mm, about 150 μm to 3 mm, or about 300 μm to 3 mm. The tape casting can further include drying the green film and/or heating the green film to burnout the components in the slurry other than the ferrite powder, e.g. the binder, the plasticizer, the dispersant, and/or the solvent. Although the methods can be used to make green films having smaller surface areas, the methods can also produce large-area green films. The green film can have a lateral area of about 1000 $cm^2$ to 5000 $cm^2$, about 1000 $cm^2$ to 3000 $cm^2$, about 2000 $cm^2$ to 5000 $cm^2$, or about 2500 $cm^2$ to 5000 $cm^2$.

The methods can include densifying the green film to produce the ferrite film. A variety of densifying techniques can be used in various embodiments of the methods. The densifying can include sintering the green film, e.g. by heating the green film to an elevated temperature and maintain the elevated temperature for a period of time. The densifying can include applying pressure to the green film, e.g. a pressure of about 10 MPa to 80 MPa, about 10 MPa to 60 MPa, about 20 MPa to 60 MPa, about 40 MPa to 60 MPa, or about 20 MPa to 50 MPa. The densifying can include applying an electric field or a voltage to the green film. The electric field can be about 100 V/cm to 1000 V/cm, about 100 V/cm to 800 V/cm, about 200 V/cm to 800 V/cm, or about 300 V/cm to 800 V/cm. The electric field or voltage can be pulsed, for example with pulses that are about 500 µs to 300 ms, about 500 µs to 250 ms, about 1 ms to 250 ms, or about 50 ms to 250 ms.

The densifying can include sintering the green film, e.g. by heating the green film to an elevated temperature and maintain the elevated temperature for a period of time. The heating can include heating at a rate of about 1° C./min to 20° C./min, about 2° C./min to 20° C./min, or about 2° C./min to 10° C./min. The elevated temperature can be about 500° C. to 2000° C., about 600° C. to 2000° C., about 700° C. to 2000° C., about 900° C. to 2000° C., about 900° C. to 1500° C., about 900° C. to 1400° C., about 950° C., about 1000° C., about 1050° C., about 1100° C., about 1150° C., about 1200° C., about 1250° C., about 1300° C., about 1350° C., about 500° C. to 1350° C., about 500° C. to 1200° C., or about 600° C. to 1200° C. The period of time can be from about 15 minutes to 200 hours, about 15 minutes to 100 hours, about 15 minutes to 20 hours, about 15 minutes to 10 hours, about 30 minutes to 10 hours, about 30 minutes to 5 hours, about 30 minutes to 3 hours, about 1 hour to 200 hours, about 1 hour to 150 hours, about 1 hour to 100 hours, about 10 hours to 100 hours, about 20 hours to 100 hours, about 24 hours to 100 hours, about 24 hours to 72 hours, or about 24 hours to 40 hours.

Ferrite Thick Films and Uses Thereof

Ferrite films are provided, in particular ferrite thick films. The ferrite film can have a thickness of greater than 50 µm, 100 µm, or 150 µm. For example the ferrite film can have a thickness of about 50 µm to 5 mm, about 100 µm to 5 mm, about 150 µm to 5 mm, about 150 µm to 3 mm, or about 300 µm to 3 mm. The ferrite thick films can also have a large area. The lateral area can be about 1000 cm$^2$ to 5000 cm$^2$, about 1000 cm$^2$ to 3000 cm$^2$, about 2000 cm$^2$ to 5000 cm$^2$, or about 2500 cm$^2$ to 5000 cm$^2$.

Figure 2:
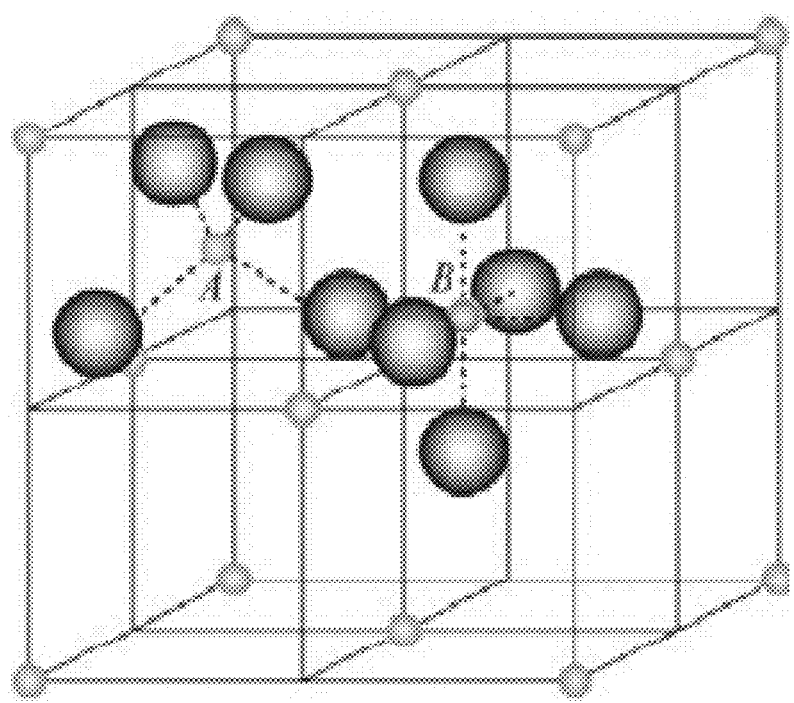
FIG. 2 is a schematic of the inverse spinel ferrite crystal structure depicting the A and B sites.
Figure 3:
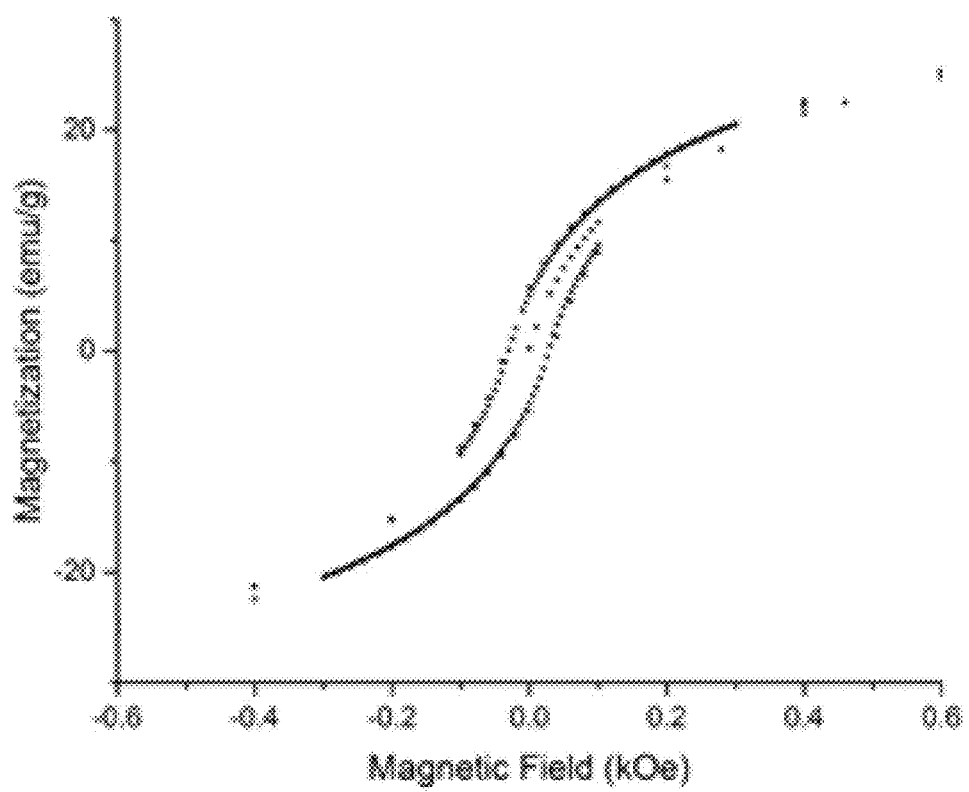
FIG. 3 is a graph of the magnetization hysteresis of a green thick film of $Ni_{0.5}Zn_{0.5}Fe_2O_4$ (NZF). The magnetization (emu/g) is depicted along the left axis as a function of the applied magnetic field (kOe).

The ferrite thick film can be an inverse spinel ferrite. Ferrimagnetic materials exhibit spontaneous magnetization at room temperature due to magnetic domains. This magnetization results from a nonzero cancellation of cations of opposite spins located on different lattice sites. Ferrites are ferrimagnetic materials with the general formula MFe2O4 where M is one or more divalent cations. These materials have the crystal spinel structure in which each unit cell contains 8 formula units with oxygen occupying the FCC lattice sites and ⅛ of the tetrahedral sites and ½ of the octahedral sites occupied by metallic cations. There are two distribution extremes that are observed in spinel ferrites. In normal spinel, the divalent iron ions are located on the octahedral sites while the trivalent M ions are located on the tetrahedral sites. In an inverse spinel structure, shown in FIG. 2, the trivalent ions are located on both the octahedral and tetrahedral sites while the divalent iron ions are positioned on the remaining octahedral sites.

The ferrite films can have a variety of grain sizes dependent upon the preparation procedure. The ferrite film can have a grain size of about 10 nm to 100 nm, about 10 nm to 50 nm, about 10 nm to 30 nm, about 10 nm, about 15 nm, about 20 nm, about 25 nm, or about 30 nm. In some embodiments, the ferrite films can have very small grain sizes of about 15 nm, about 12 nm, about 10 nm, about 8 nm, about 6 nm, or less. The ferrite film can have larger grain sizes, for example about 100 nm to 30 µm, about 300 nm to 30 µm, about 300 nm to 25 µm, about 300 nm to 25 µm, about 1 µm to 25 µm, or about 5 µm to 25 µm. The ferrite film can have a high resistivity, e.g. about 8 Ohm-m, about 10 Ohm-m, about 100 Ohm-m, about 500 Ohm-m, or more. The ferrite film can have a permeability of about 10 to 2000, about 10 to 1000, about 10 to 500, about 10 to 100, about 50 to 2000, about 50 to 1000, or about 50 to 500.

The ferrite film can include $XFe_2O_4$, wherein X is Ni, Zn, Co, Fe, Ti, Mn, or any combination thereof. The ferrite film can be an inverse spinel ferrite. The ferrite film can include $Ni_xCo_yFe_zO_4$, $Ni_xZn_yFe_zO_4$, or $Co_xZn_yFe_zO_4$. Each occurrence of x can be about 0.05 to 0.75, about 0.1 to 0.6, about 0.2 to 0.6, or about 0.25 to 0.55. Each occurrence of y can be about 0.05 to 0.75, about 0.1 to 0.6, about 0.2 to 0.6, or about 0.25 to 0.55. Each occurrence of z can be about 1.5 to 3.0, about 1.8 to 2.8, about 1.8 to 2.3, or about 2.0. The sum of x, y, and z can be about 3.0. In some embodiments, the ferrite powder has the formula $Ni_{0.19}Zn_{0.28}Co_{0.03}Fe_{2.5}O_4$. The ferrite film can include Co having a stoichiometry ranging from about 0.01 to 0.6, about 0.05 to 0.5, about 0.01 to 0.1, or about 0.3 to 0.6.

Various electronic devices can be developed using the ferrite thick films provided herein. For typical antenna, the total lateral area of the ferrite substrate is on the order of 1600 cm$^2$. The cavity between the antenna radiator and ground plane can be designed to be between 2.5 mm to 20 mm, depending on the intended frequency range. Given current electromagnetic performance requirements, the ferrite film can fill at least about 50% of this cavity, e.g. about 40% to 100%, about 50% to 100%, or about 50% to 90%. Antenna including the ferrite films can operate in the very high frequency (VHF) and/or the ultra high frequency (UHF) region. For example, the antenna can operate at a frequency of about 0.1 GHz to 5 GHz, about 0.5 GHz to 5 GHz, about 1 GHz to 5 GHz, or about 1 GHz to 3 GHz.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

NZF Thick Films

Figure 5:
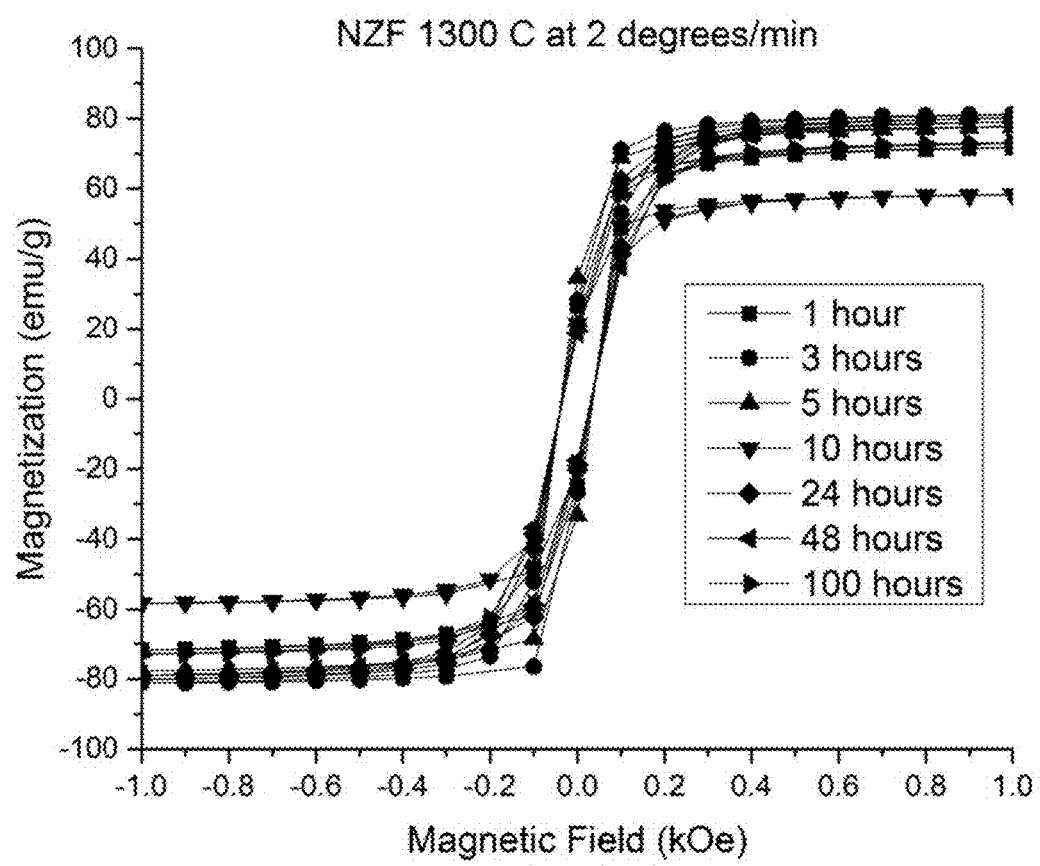
FIG. 5 is a graph of the magnetization hysteresis for thick films of $Ni_{0.5}Zn_{0.5}Fe_2O_4$ (NZF) heated at 2° C./min sintered at either 1300° C. for varying times ranging from 1 hour to 100 hours or at 950° C. for 100 hours.

A tape casting system was used to create large-area films of around 300 µm thickness. Cast green thick films were studied to provide a baseline for comparison for microstructure and magnetic behavior. As the green thick films were heated, constituents other than the ferrite powder were burnt-out. Thermogravimetric analysis (TGA) and differential thermal analysis (DTA) were used to study the binder burn-off temperature, which was found to be ~350° C. Before and after, scanning electron microscopy (SEM) images revealed that the binder burnout was homogenous. Energy dispersive X-ray (EDS) maps of the NZF film post-burnout, confirmed the homogeneous distribution of elements. Furthermore, x-ray diffraction (XRD) confirmed the inverse spinel structure of nickel zinc ferrite and the absence of other phases. Magnetization hysteresis of a green thick film is shown in FIG. 5; note that the saturation magnetization ($M_s$) is low, ~20 emu/g. Green thick films were then sintered at temperatures varying from 950° C. to 1300° C. in air. Scanning electron microscope (SEM) results at sintering temperatures of 1100° C., 1200° C., and 1300° C. showed that increased sintering temperature yielded larger grain sizes for $Ni_{0.5}Zn_{0.5}Fe_2O_4$ (NZF) tapes processed at a heating rate of 2° C./min in air with a sintering time of 3 hours.

Figure 4:
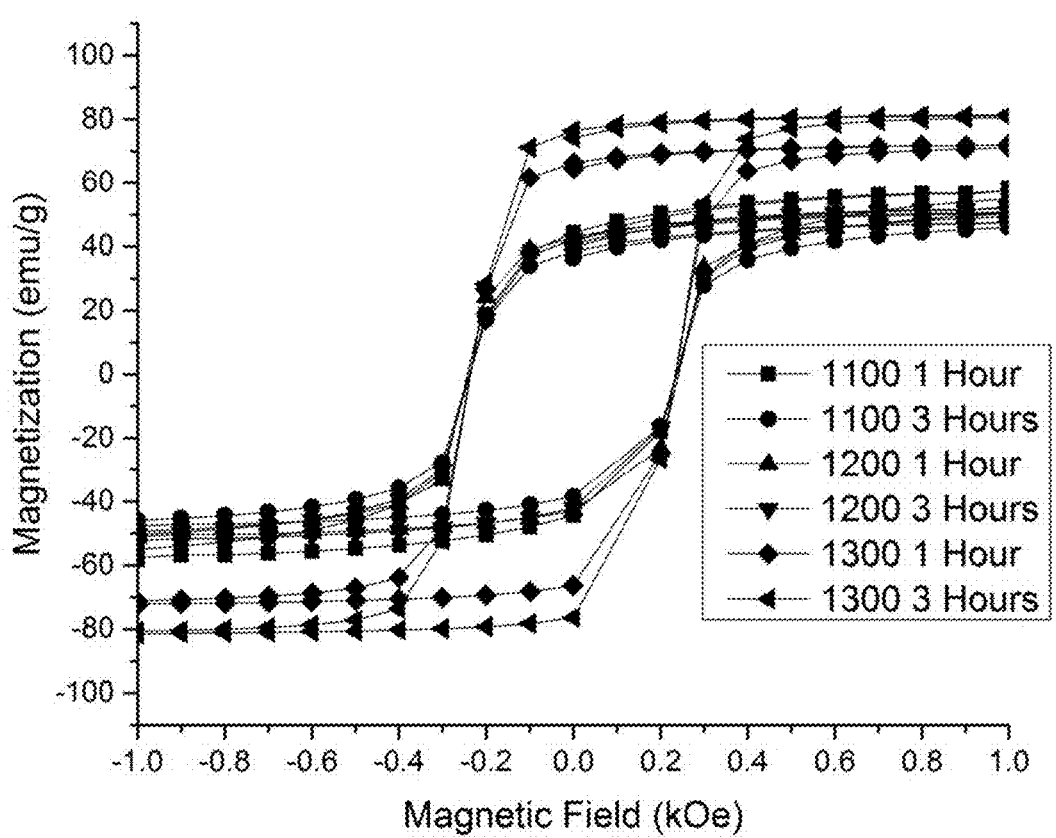
FIG. 4 is a graph of the magnetization hysteresis for thick films of $Ni_{0.5}Zn_{0.5}Fe_2O_4$ (NZF) heated at 2° C./min to 1100° C., 1200° C., or 1300° C. for 1 hour or 3 hours. $M_s$ increases with temperature.

FIG. 4 plots the magnetic behavior of thick films after sintering at 1100° C., 1200° C. and 1300° C.; $M_s$ is much greater than in the green thick film, and increases with increasing sintering temperature. Subsequent studies were therefore performed at 1300° C.

The effects of processing conditions on densification were studied by varying sintering time from 1 to 100 hours. Two heating rates, 2° C./min and 10° C./min, were used to study the effect of heating rate on grain size. Densification was quantified via image processing using top-view SEM images to obtain percent porosity for each sample. Final porosity data was averaged over 5 or more images from each sample. In general, increased sintering time resulted in increased grain size. At 100 hours, ~100% densification was achieved with grain sizes in some cases exceeding 60 μm. Faster heating rates led to smaller grain size, as was confirmed by SEM images of $Ni_{0.5}Zn_{0.5}Fe_2O_4$ (NZF) tapes sintered at 1300° C. under varying sintering conditions. NZF tapes were heated at 2° C./min with sintering for 10 hours; heated at 2° C./min with sintering for 48 hours; heated at 2° C./min with sintering for 100 hours; heated at 10° C./min with sintering for 10 hours; heated at 10° C./min with sintering for 48 hours; or heated at 10° C./min with sintering for 100 hours. Densification increased with sintering time, and faster heating rates yielded smaller grains. Faster heating rates still yielded ~100% dense tapes after 100 hours. Cross-sectional image confirmed that densification was through-thickness in the thick films.

Figure 6:
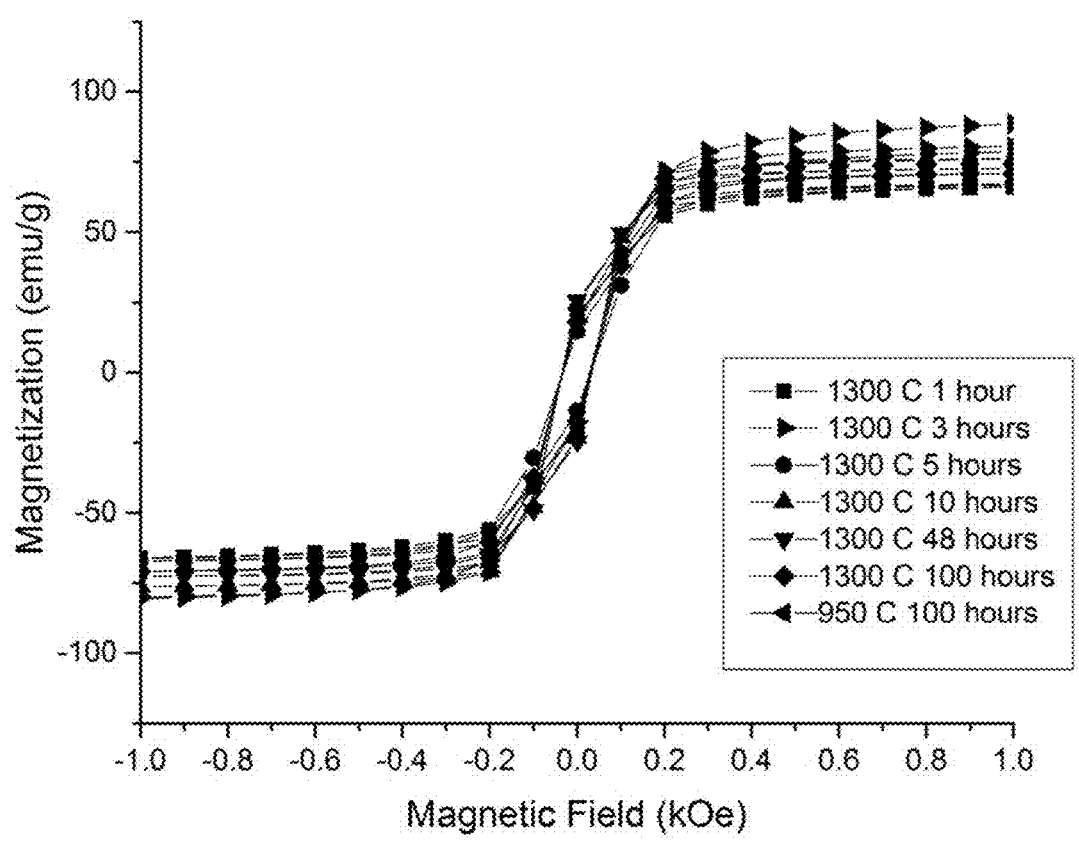
FIG. 6 is a graph of the magnetization hysteresis for thick films of $Ni_{0.5}Zn_{0.5}Fe_2O_4$ (NZF) heated at 10° C./min sintered at either 1300° C. for varying times ranging from 1 hour to 100 hours or at 950° C. for 100 hours.

Magnetization behavior was characterized for each set of processing conditions to study connections between processing parameters and magnetic behavior. The resulting magnetization hysteresis is shown in FIGS. 5 and 6. The coercivity ($H_c$) is independent of sintering conditions. For both heating rates, it was found that a sintering time of 3 hours yielded the highest $M_s$. Not wishing to be bound by any theory, $M_s$ variations are thought to be connected to changes in grain orientation and texturing.

Figure 7:
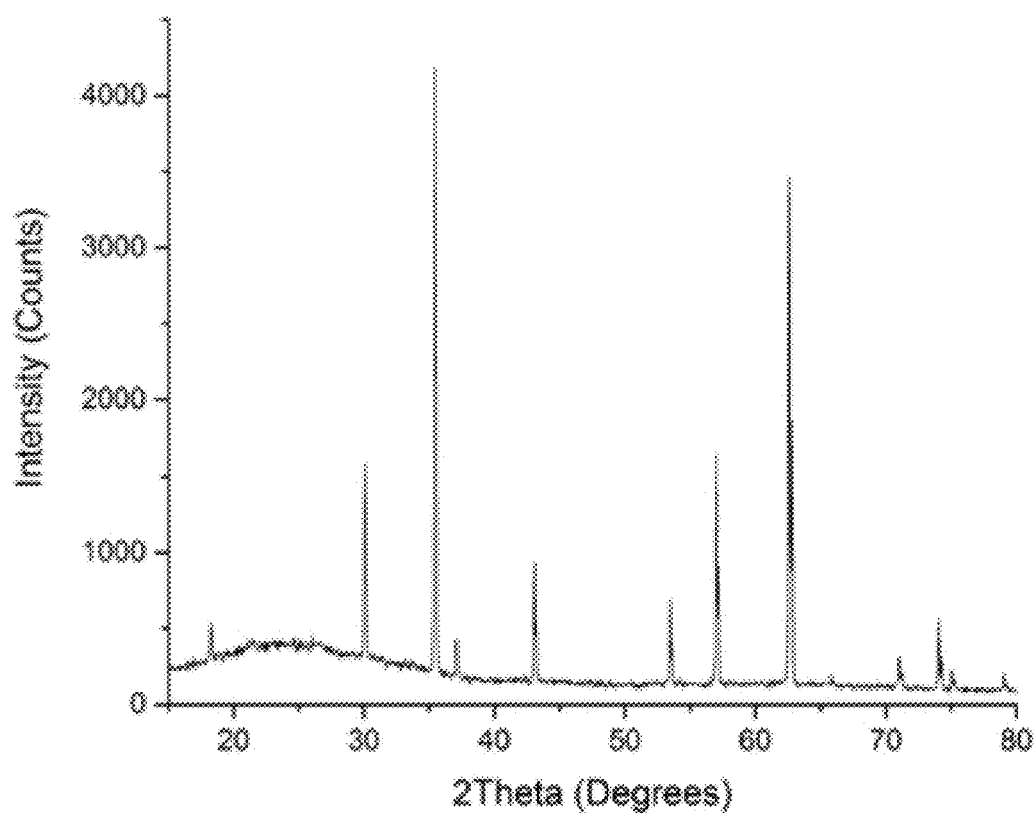
FIG. 7 is a graph of the x-ray diffraction (XRD) pattern for $Ni_{0.5}Zn_{0.5}Fe_2O_4$ (NZF) tape sintered at 1300° C. for 10 hours with a heating rate of 2° C./min depicting the inverse spinel structure.
Figure 8:
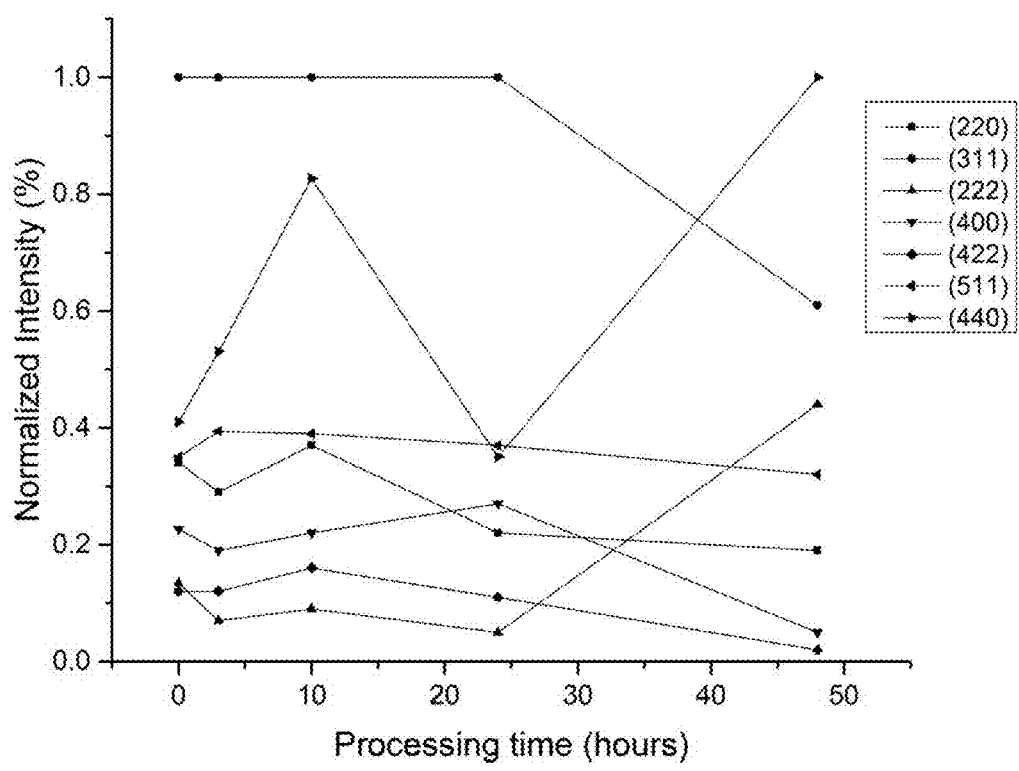
FIG. 8 is a graph of the normalized intensities (%) of Miller planes versus sinter time (hours) for $Ni_{0.5}Zn_{0.5}Fe_2O_4$ (NZF) tapes sintered at 1300° C.

X-ray diffraction (XR)D was used to study changes in crystallography. All samples showed the inverse spinel structure, an example of which is shown in FIG. 7, but the normalized intensities of each plane varied significantly with sintering time. FIG. 8 shows the normalized intensities of each plane at different sintering times. As sintering time increases, the (440) planes become more prevalent, whereas for shorter times the (311) planes dominate. These changes in preferential planes could account for the surface features on the SEM images and the changes in saturation magnetization.

The results demonstrate that the chemical solution deposition approach can be scaled up to large area, thick ferrite films via tape casting. A peak sintering temperature of 1300° C. is challenging for integration with devices.

NZCF Thick Films

Figure 10:
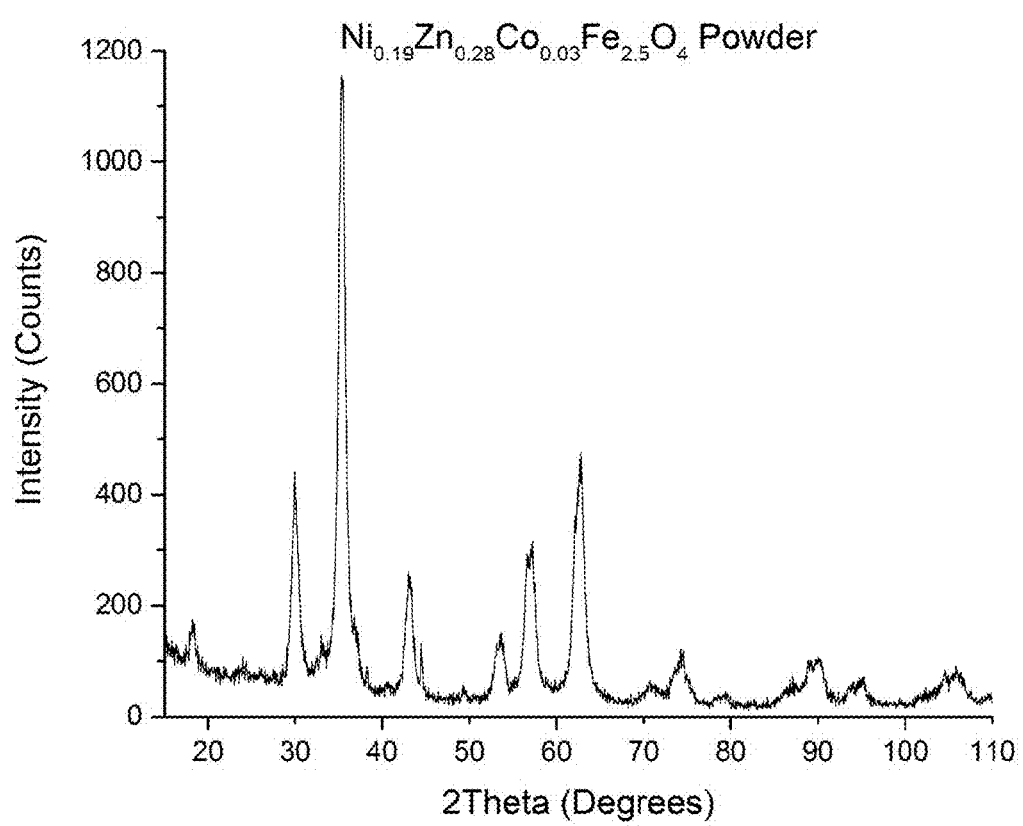
FIG. 10 is an X-Ray diffraction (XRD) pattern for as-received NZCF powder.

The as-received NZCF powder was examined initially. X-ray diffraction (XRD) was used to investigate the structure of the as-received NZCF powder. Results illustrated in FIG. 10 confirmed that the stoichiometry is an inverse spinel structure; however, small non-spinel peaks were also found to be present, suggesting the presence of other phases in the material.

Inductively coupled plasma atomic emission spectroscopy (ICP-ES) was used to investigate possible impurities that may have contributed to these additional phases. Normalizing by cobalt, the stoichiometry of the green powder was found to be $Ni_{0.18}Zn_{0.27}Co_{0.03}Fe_{2.5}O_4$, which is significantly lacking in iron content. Small impurities of sodium and carbon were found in the material, but have not been linked to the unidentified phase in the XRD pattern.

Figure 11:
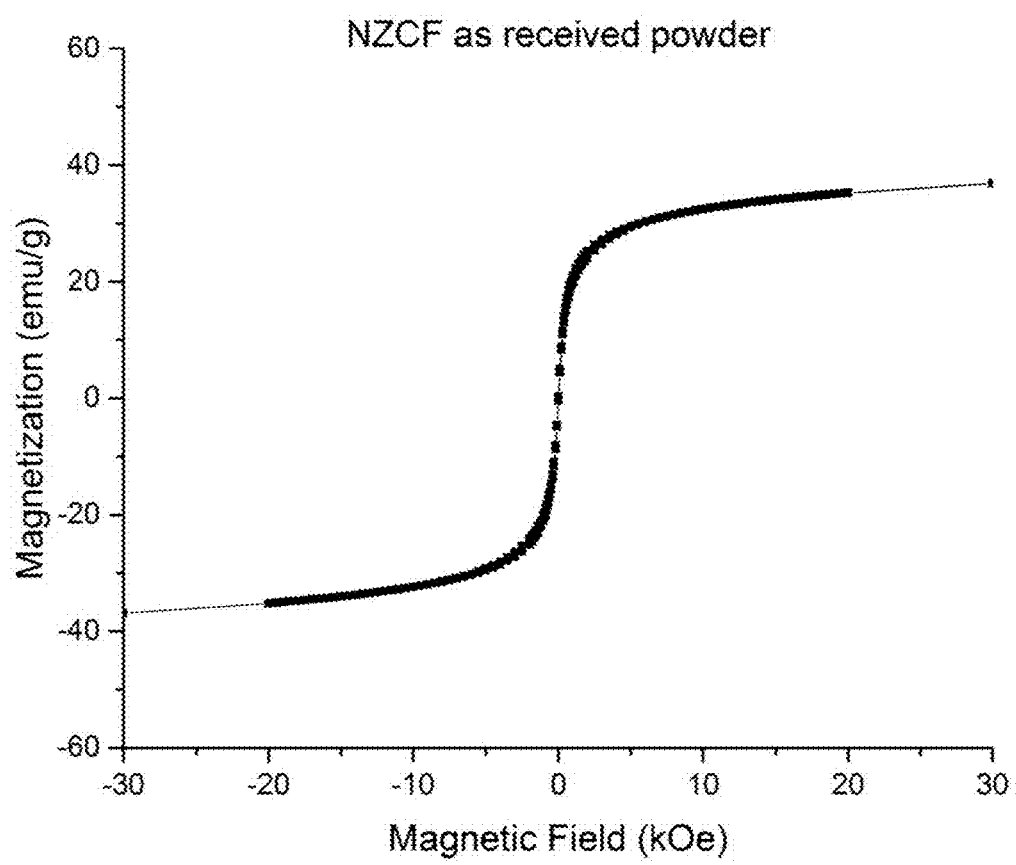
FIG. 11 is a magnetization hysteresis for as-received NZCF powder.

A vibrating superconducting quantum interference device (SQUID) magnetometer was used to characterize the magnetization behavior of the as-received powder NZCF. As shown in FIG. 11, green NZCF powder was found to have a saturation magnetization of 36 emu/g.

The NZCF was used in a series of tape casting examples. The doctor blade used for these examples had a 6 inch width. The slurry to be placed in the doctor blade was created using a two-step process as illustrated in FIG. 9. 3 ounce batches of slurry were produced for each casting. First, the NZCF powder, ethanol, and blown Z-3 menhaden fish oil were combined and ball milled for 24 hours in 4 ounce bottles using 50 zirconia milling media. Then, butyl benzyl phthalate and B98 polyvinyl butyral were added to the mixture and ball milled for 24 hours. The plasticizer was added before the binder to ensure even mixing. After ball milling was completed, the slurry was immediately cast onto a mylar substrate to make sure that none of the components have time to settle.

It can be possible to use a shortened ball milling scheme. In this case, the total milling time can be reduced to 24 hours with the first step taking about 8 hours and the second about 16. There was no noticeable difference when casting.

The thickness of the green tape was set by the height of the doctor blade. The thicker the films, the greater the chance of cracking occurring on the surface of the films due to the surface of the film drying faster than the solvent can evaporate from the bottom of the sample. To find the maximum thickness possible to cast without causing surface cracking, different doctor blade heights were tested. The doctor blade height was monitored by using feeler gauges to measure the gap height. The gap height was adjusted by moving two micrometers that each controls half of the doctor blade. The doctor blade heights used were roughly 150 μm, 200 μm, 300 μm, 450 μm, and 600 μm. The two smallest heights, 150 μm and 200 μm, created crack-free green tapes, while the two largest heights created large cracks in the films. 300 μm was an intermediary height: cracks would inconsistently appear using this doctor blade height.

Cracked films removed easily from the silicone coated mylar surface. To remove tape, the mylar was slowly rolled back away from the film and the film easily falls off of the surface. Removing the crack-free films from the mylar casting surface was far more challenging. Thin casts under 200 nm adhered to the surface of the mylar. These films were so thin that any pressure applied to remove them from the mylar resulted in the films crumbling or rolling into thin strips. Contrastingly, the edges of thicker films easily released from the mylar; however, these released pieces would snap away from the rest of the film when trying to peel the center away from the surface. Once the film was removed from the mylar, films were cut down to sizes necessary for each characterization method.

Different processing conditions for NZCF were examined including sintering temperature and total sintering time. All films were processed using a 10° C./min heating rate and furnace cooled. All samples were placed on an alumina boat or plate. Samples were heated to 1000° C., 1100° C., 1200° C., 1300° C., and 1400° C. At each temperature, samples were created using a 3 hour sintering time. More sintering times were used to create a wider variety of samples at the highest two temperatures. Sintering times used for samples heated to 1300° C. were 1 hour, 3 hours, 10 hours, 24 hours, 48 hours, 72 hours, and 100 hours. Sintering temperatures for samples heated to 1400° C. included 1 minute, 5 minutes, 10 minutes, 1 hour, 3 hours, and 100 hours.

While heating, samples often gain some degree of curvature. This curvature is more severe at longer sintering times. As this curvature is prohibitive for certain characterization methods, small alumina boats are placed on top of samples to ensure that they remain flat. With sintering times longer than 10 hours, the samples frequently stick to the alumina boat and must be gently pried off using a non-magnetic pair of tweezers. Once cooled, samples were brittle and required gentle handling. Due to this brittleness, samples often broke during the removal process, so it frequently required multiple tries to obtain samples of particular shapes or dimensions.

While handling both green and fired tapes, only non-magnetic instruments were used, such as stainless steel scissors or carbon-tipped tweezers. Non-magnetic tools are required so as not to alter results by unknowingly inducing magnetization in the samples.

To create films that are stacked to increase overall thickness, 2-3 samples were placed on top of each other in an alumina boat. Another smaller alumina boat is then placed on top of the samples to apply pressure. Three samples were created using this method. The first consisted of two 1 inch$^2$ samples stacked and heated to 1300° C. and held at temperature for 3 hours. The second was two 1 cm$^2$ samples stacked and heated to 1300° C. with a 72 hour sintering time. The third consisted of three 1 cm$^2$ samples fired at 1300° C. for a 100 hour sintering time. These samples were roughly handled to get a idea of the strength of the bond between layers, but were not further characterized.

Samples were characterized using various methods. Scanning electron microscopy (SEM) with energy dispersive spectrometry (EDS) was used to examine the homogeneity of elemental distributions of green and fired thick films and to determine changes in grain size and density in samples. Note that as this EDS instrument was not calibrated for NZCF samples in particular, all numerical data obtained from this technique was only used for qualitative analysis. Only un-magnetized samples were examined so as not to damage the instrument. XRD was used for phase and texture analyses. Green and heat-treated films were examined to confirm an inverse spinel structure and determine texture. Samples were leveled by placing a glass slide on top of the sample causing all spots with curvature to flatten. Eliminating curvature ensured that the x-rays hit each spot of the sample with the same angle. The sample is then placed in a low-background sample holder for measurement.

DC magnetic measurements of green and fired films were made using a SQUID magnetometer. Magnetization hysteresis loops were measured at room temperature. To ensure that the shape effect was removed from the results, each sample was ground into powder using a mortar and pestle. Each batch of powder was then split into ~50 mg samples. Each sample's mass was weighed using an analytical balance and then placed into a plastic capsule for measurement. This capsule was placed into a straw and placed into the SQUID. The SQUID measured a standard hysteresis loop over the range −3 to 3 T. The magnetic moment data obtained by the SQUID is then converted to magnetization by normalizing by sample mass.

To find a suitable sintering temperature for NZCF that would yield a large magnetization saturation as well as a dense film, all films were cast with a 600 μm doctor blade height for the following images. SEM was used to study the changes in density of the films with temperature. As temperature increased, grain size and densification increased. At 1300° C. and above, pores were no longer prevalent in the top-view images of the samples even when scanning across the entire image. This lack of pores suggests that the films were nearing full densification; however, cross-sectional images are required to confirm densification of the full body of the sample.

Further magnification of top-down SEM images revealed triangular shaped features that began to form in the sample. These features suggested that changes in sintering conditions promotes the growth of preferential planes within the crystal structure.

EDS was used on these NZCF images as a baseline method to observe any inhomogeneity that may be present in samples. From observing these images, it does not appear that there are any inhomogeneities of the elements in these samples. This suggests that the films are completely homogeneous at least at the resolution of the instrument. Further, note that cobalt is not detected using this method. Cobalt L alpha rays overlap with both nickel and iron L alpha rays. Due to this overlap, the software would not assign any counts to cobalt, making appear as if cobalt is not present in this material. An unassigned peak, suggested the presence of cobalt; however, we were not able to confirm using this technique. Different methods must be used to confirm the stoichiometry of these NZCF samples.

Figure 12:
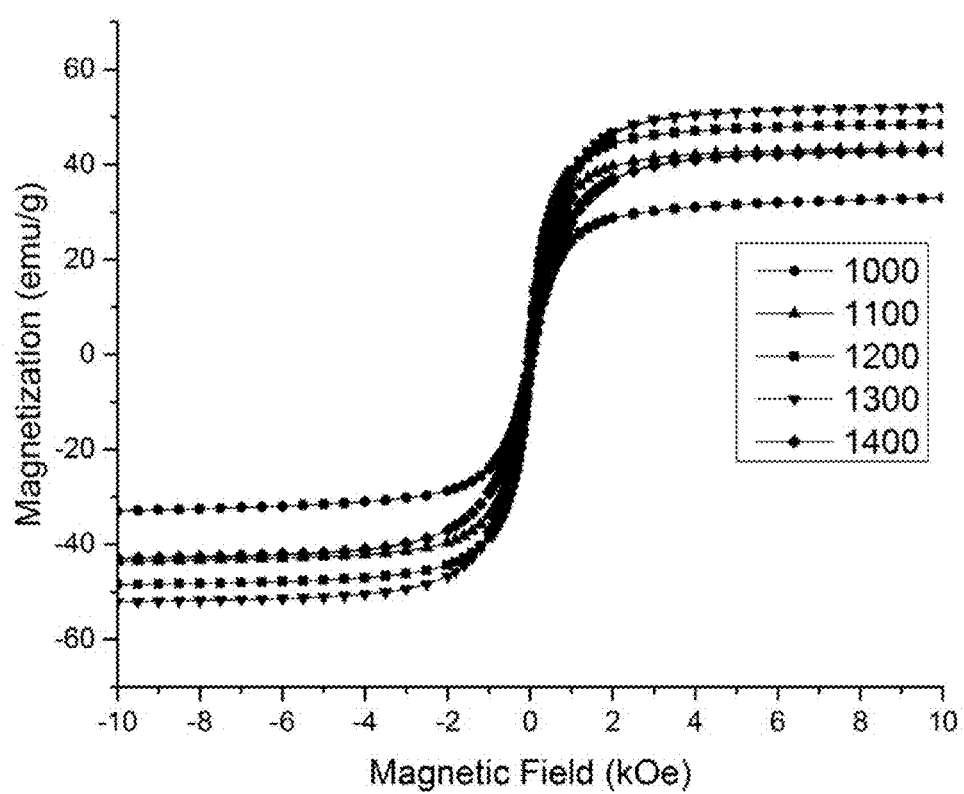
FIG. 12 is a graph of the hysteresis curves for NZCF samples processed at different temperatures with a 10° C./min heating rate and 3 hour sintering time.

Magnetization saturation variation with sintering time was studied using SQUID. As shown in FIG. 12, increasing temperature increased the saturation magnetization of the films up to 1300° C. This increase is likely attributed to increased ionic mobility, which places the cations in positions that maximizes the total magnetic moment of the material. At 1400° C., the saturation of the film is drastically decreased. At such high temperatures, it is possible that zinc loss is prevalent enough to alter positions of the cations in the spinel structure such that the iron magnetic moments begin cancelling each other, reducing the total magnetic moment. This magnetization saturation decrease at 1400° C. determined that 1300° C. would be the suitable temperature for processing NZCF.

The second goal of this project was to study the effect of changing sintering time on the density and structure of NZCF. Variations in sintering time were studied for two sets of samples: one was heated to 1300° C. and the other to 1400° C. Results for the higher temperature films will be discussed first. These films were cast with a doctor blade height of 600 μm. Samples were heated with sintering times of 1 minute, 10 minutes, 1 hour, 3 hours, and 100 hours. Times at each extreme were used to fully map out the limitations on grain size and density at this temperature. FIG. 12 shows top-view SEM images of these some of these films. As expected, grain size increased with increasing sintering times. It can be observed that few pores are visible even with a sintering time as short as 1 minute. This suggests that densification began during the heating process at a temperature lower than 1400° C.

At 100 hours, an interesting microstructure occurred. The sample was divided into large grains containing directional ridge features. Some of these grains spanned the entirety of the sample and were so large that they could not be fully observed at the instrument's lowest magnification. The resolution of the EDS on the instrument was unable to detect any element concentrations on or near these ridges, so driving factors behind these features are not yet understood.

Figure 13:
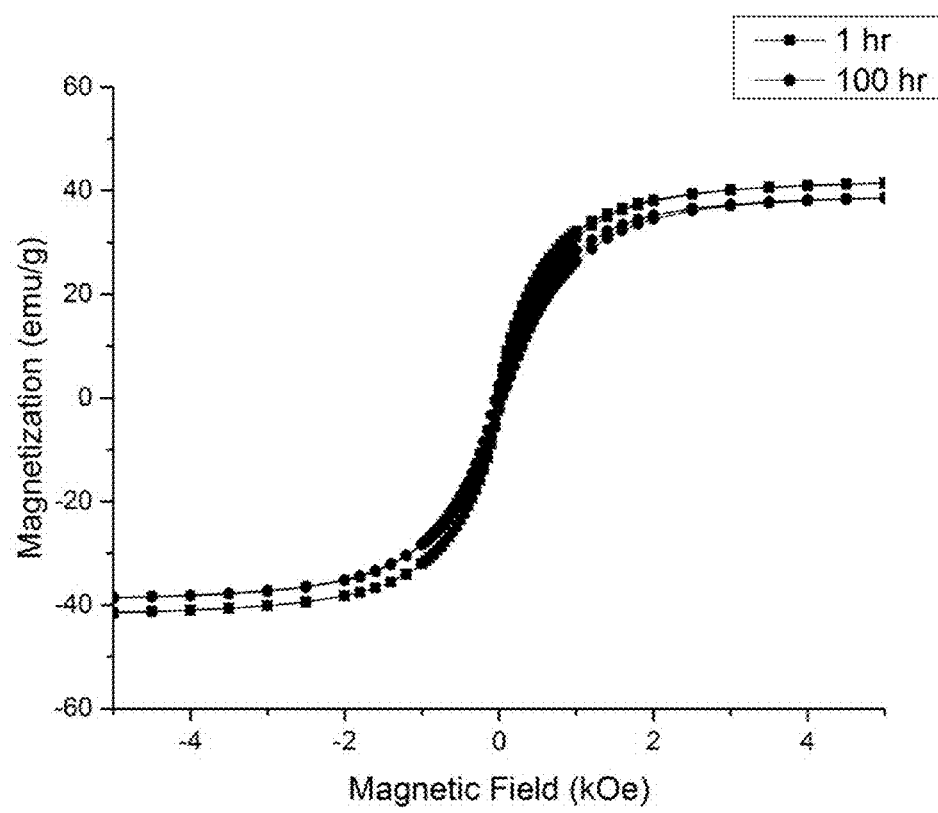
FIG. 13 is a graph demonstrating the difference in magnetization saturation between samples with sintering time of 1 and 100 hours.

SQUID was used to determine if sintering time, in particular if the microstructural features of the 100 hours samples, had any effect on the magnetic properties of the material. The hysteresis loops of a 1 hour sintering time sample and a 100 hours sintering time sample are compared in FIG. 13. While it appears that the 1 hour sample has a slightly larger magnetization saturation, the difference between the two samples is within the error of the instrument, so it may be concluded that the microstructural features of the long sintering time sample does not impact the saturation of the material.

Figure 14:
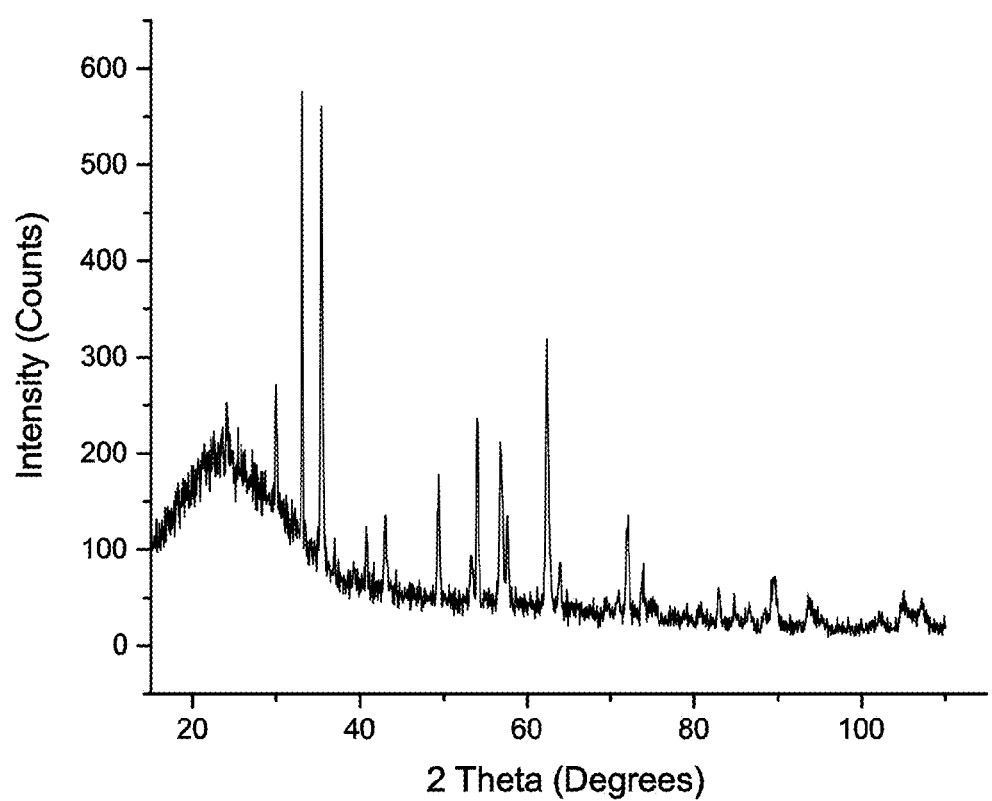
FIG. 14 is an X-Ray diffraction (XRD) pattern for a NZCF sample heated to 1400° C. for 1 hour.

XRD was used on a sample heated to 1400° C. for 1 hour to determine if the inverse spinel structure remained after firing. FIG. 14 shows the XRD pattern. It was found that the inverse spinel structure is maintained after firing; however, the unidentified phase is maintained as well.

The second set of samples studied for sintering time variation were heated to 1300° C. This set was primarily created to determine whether features similar to those of the 1400° C. 100 hours sintering time sample emerge. Samples were processed with sintering times of 10 hours, 24 hours, 48 hours, 72 hours, and 100 hours.

It was observed that porosity was introduced at a sintering time of 72 hours and that most grains have ridge-like microstructural features on the surface. In the magnified image, grain boundaries are not as clearly distinguishable as those in the magnified image of the 100 hours films. The longest sintering time sample no longer has visible pores on the surface of the film. Further, at this temperature, the unusual microstructural features of the 1400° C. sample do not appear. SEM images with sintering times in between 72 and 100 hours are required to understand the transition between these microstructural arrangements.

Figure 15:
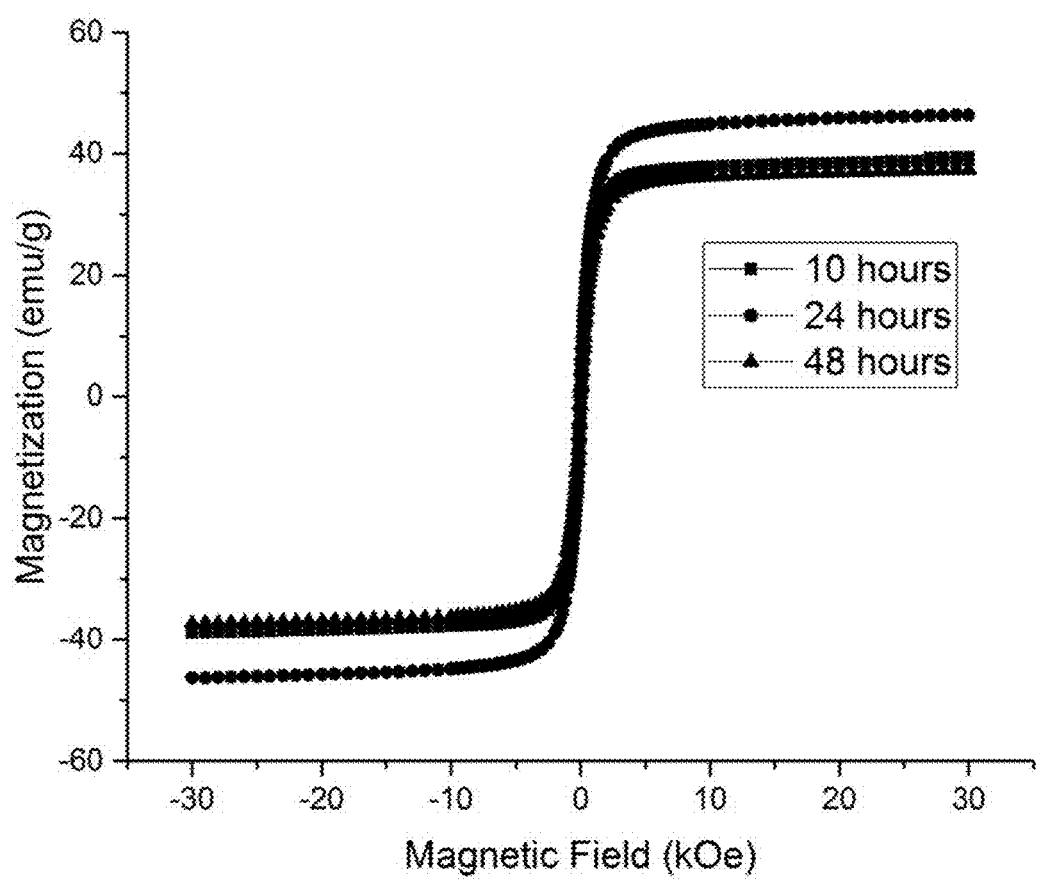
FIG. 15 is a graph of the magnetization curves for NZCF samples heated to 1300° C. with different sintering times.

As with the earlier set of samples, SQUID was used to determine if changes in sintering time translated to changes in saturation magnetization. Slight variations were observed in saturation magnetization at different sintering times, which is illustrated in FIG. 15, but are within the error of the instrument. Thus, as with the 1400° C. samples, sintering time did not have a large affect on the saturation magnetization of the material.

Figure 16:
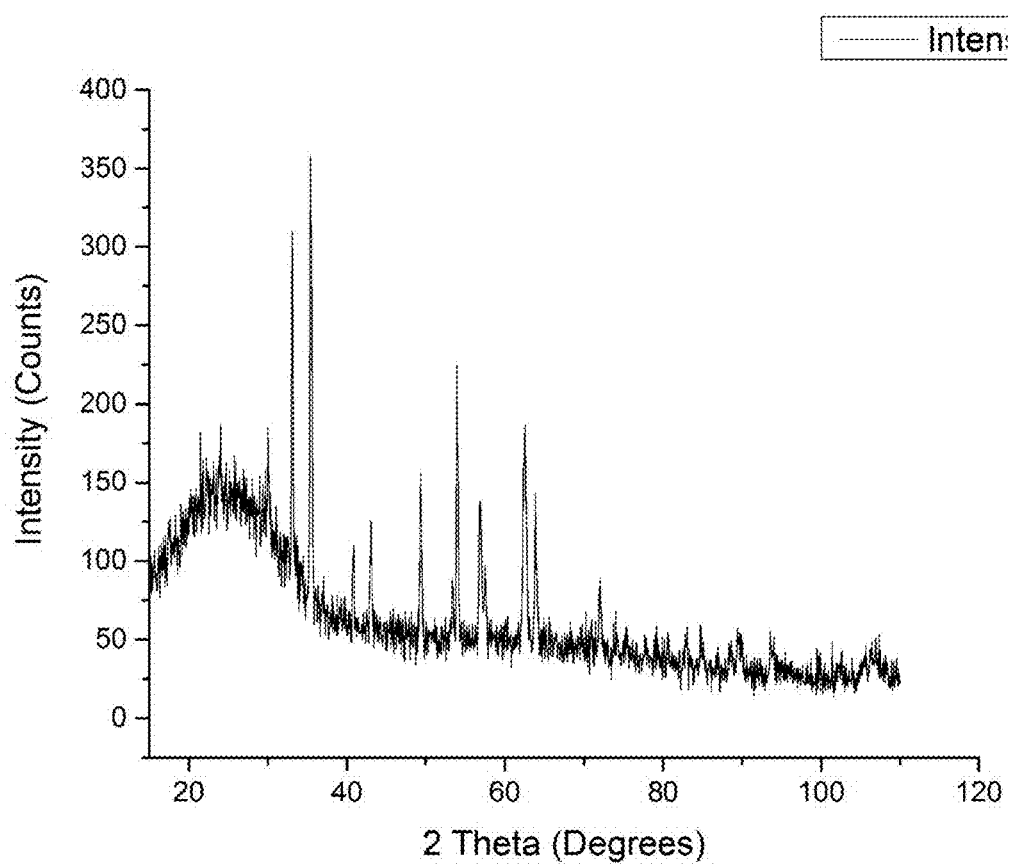
FIG. 16 is an X-Ray diffraction (XRD) pattern for a NZCF tapes processed at 1300° C. with a 10° C./min heating rate and 48 hours sintering time.
Figure 17:
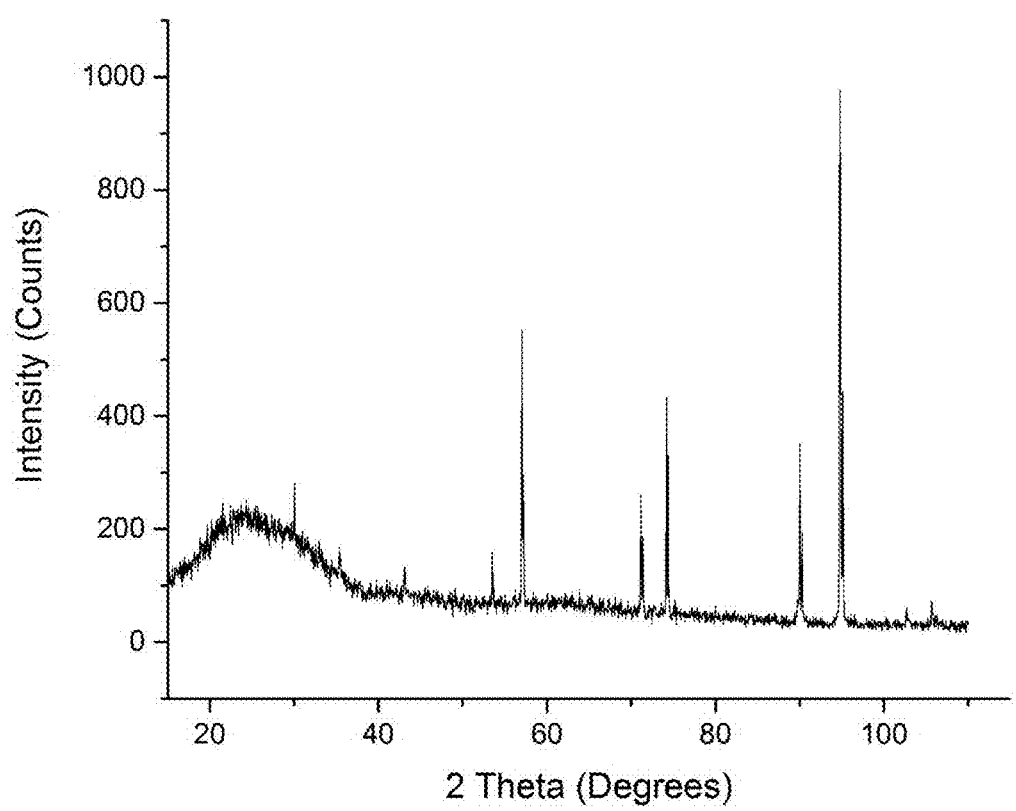
FIG. 17 is an X-Ray diffraction (XRD) pattern for a NZCF tapes processed at 1300° C. with a 10° C./min heating rate and 100 hours sintering time.

XRD was used on samples heated at 1300° C. to study how changes in sintering time affected the spinel structure of the films as well as the unidentified additional phases in NZCF. As sintering time increased, it was found that the inverse spinel structure dominated over the unidentified phases. It was observed in the XRD patterns shown in FIGS. 16-17 that at a sintering time of 48 hours, while the intensity peaks are sharp, the signal was noisy. Some of these additional peaks corresponded to the unidentified phase seen in the as-received powder, while others can be attributed to background noise. At a longer sintering time of 100 hours, the XRD pattern contained peaks that correspond only to the inverse spinel structure. Thus, despite having a high saturation and minimal porosity at short sintering times, long sintering times were required to make NZCF primarily have a spinel structure.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A method of making a ferrite film, the method comprising
   tape casting of a slurry to produce a green film, wherein the slurry comprises a ferrite powder, a dispersant, and a binder in a suitable solvent;
   densifying the green film to produce the ferrite film having a thickness of 50 µm to 5 mm; and
   wherein the ferrite powder is $Ni_{0.19}Zn_{0.28}Co_{0.03}Fe_{2.5}O_4$.

2. The method of claim 1, wherein the ferrite powder has an average particle diameter of about 20 nm to 50 nm.

3. The method of claim 1, wherein the dispersant is a fish oil.

4. The method of claim 1, wherein the binder is a polyvinyl butyral.

5. The method of claim 1, wherein the solvent is ethanol.

6. The method of claim 1, wherein the tape casting comprises casting the green film onto a glass or polymer substrate.

7. The method of claim 1, wherein the tape casting comprises heating the green film to burnout the dispersant, the binder, and the solvent.

8. The method of claim 1, wherein the densifying comprises heating the green film to a temperature of about 900° C. to 1400° C. and maintaining the temperature for a period of time of about 1 hour to 150 hours.

9. The method of claim 8, wherein the heating is at a heating rate of about 2° C./min to 20° C./min.

10. The method of claim 1, wherein the densifying comprises applying a pressure of about 40 MPa to 60 MPa to the green film.

11. The method of claim 1, wherein the densifying comprises applying an electric field to the green film, and wherein the electrical field is pulsed with pulses that are about 500 µs to 300 ms.

12. A method of making a ferrite film, the method comprising
    tape casting of a slurry to produce a green film, wherein the slurry comprises a ferrite powder, a dispersant, and a binder in a suitable solvent;
    densifying the green film to produce the ferrite film having a thickness of 50 µm to 5 mm;
    wherein the ferrite powder is $Ni_{0.19}Zn_{0.28}CO_{0.03}Fe_{2.5}O_4$; and
    wherein the densifying comprises applying an electric field to the green film.

13. The method of claim 12, wherein the electrical field is pulsed with pulses that are about 500 µs to 300 ms.

14. The method of claim 12, wherein the ferrite powder has an average particle diameter of about 20 nm to 50 nm.

15. The method of claim 12, wherein the binder is a polyvinyl butyral.

16. The method of claim 12, wherein the solvent is ethanol.

17. The method of claim 12, wherein the tape casting comprises casting the green film onto a glass or polymer substrate.

18. The method of claim 12, wherein the tape casting comprises heating the green film to burnout the dispersant, the binder, and the solvent.

* * * * *